United States Patent [19]

Taniguchi

[11] Patent Number: 5,756,939
[45] Date of Patent: May 26, 1998

[54] COMBINATIONAL WEIGHING MACHINE

[75] Inventor: Aritoshi Taniguchi, Kyoto, Japan

[73] Assignee: Ishida Co., Ltd., Japan

[21] Appl. No.: 567,406

[22] Filed: Dec. 5, 1995

Related U.S. Application Data

[63] Continuation of Ser. No. 83,738, Jun. 25, 1993, abandoned.

[30] Foreign Application Priority Data

Jun. 26, 1992 [JP] Japan ................................. 4-192991

[51] Int. Cl.$^6$ .................................................. G01G 13/00
[52] U.S. Cl. ........................ 177/25.18; 177/50; 177/121; 222/56
[58] Field of Search ........................ 177/25.18, 50, 177/116, 121; 366/151, 152; 141/83; 222/55, 56, 64, 77

[56] References Cited

U.S. PATENT DOCUMENTS

| | | | |
|---|---|---|---|
| 4,708,215 | 11/1987 | Nakamura et al. | 177/25.18 |
| 4,727,947 | 3/1988 | Naito | 177/164 |
| 4,762,252 | 8/1988 | Hyer et al. | 222/56 |
| 4,811,256 | 3/1989 | Yamada et al. | 177/25.18 X |
| 5,074,436 | 12/1991 | Inoue | 222/56 |

*Primary Examiner*—Michael L. Gellner
*Assistant Examiner*—Randy W. Gibson
*Attorney, Agent, or Firm*—Majestic, Parsons, Siebert & Hsue

[57] ABSTRACT

A combinational weighing machine has articles delivered to a dispersion feeder, distribtuted therefrom to a plurality of weigh hoppers through independently driven radial feeders, and weighed such that a combination of weigh hoppers can be selected and their contents can be discharged together. Vibrations of each radial feeder are controlled by parameter values which are calculated on the basis of the parameter values previously set therefor and the weight of the articles in the corresponding weigh hopper. When the amount of the articles on the dispersion feeder drops abnormally and becomes less than a certain lower limit, the parameter values at the time are stored and, when the amount of the articles on the dispersion feeder returns to normal again, parameter values based on the stored values are used, instead of the previous parameter values, to calculate new parameter values to control the vibrations of the radial feeders.

11 Claims, 3 Drawing Sheets

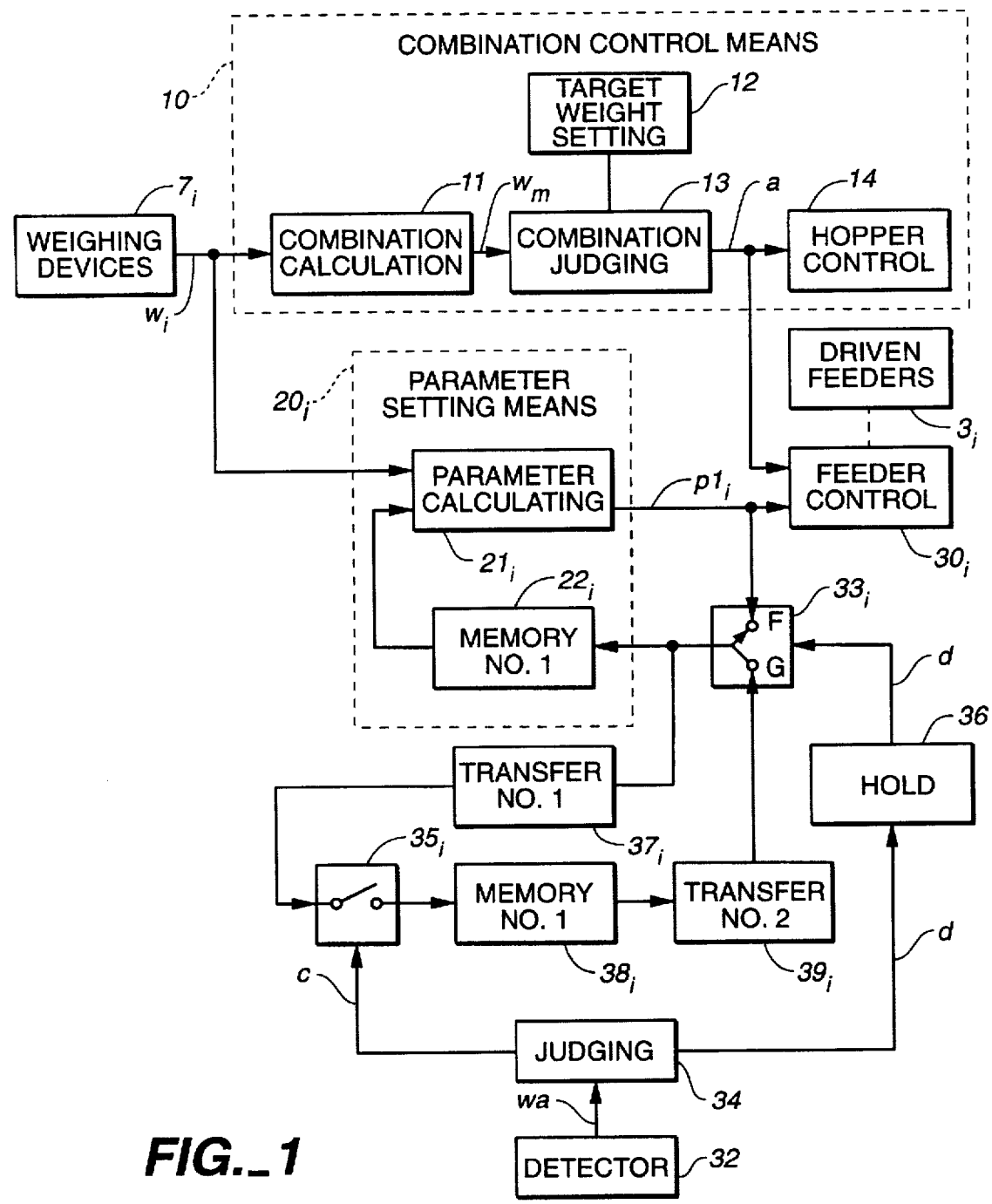
FIG._1

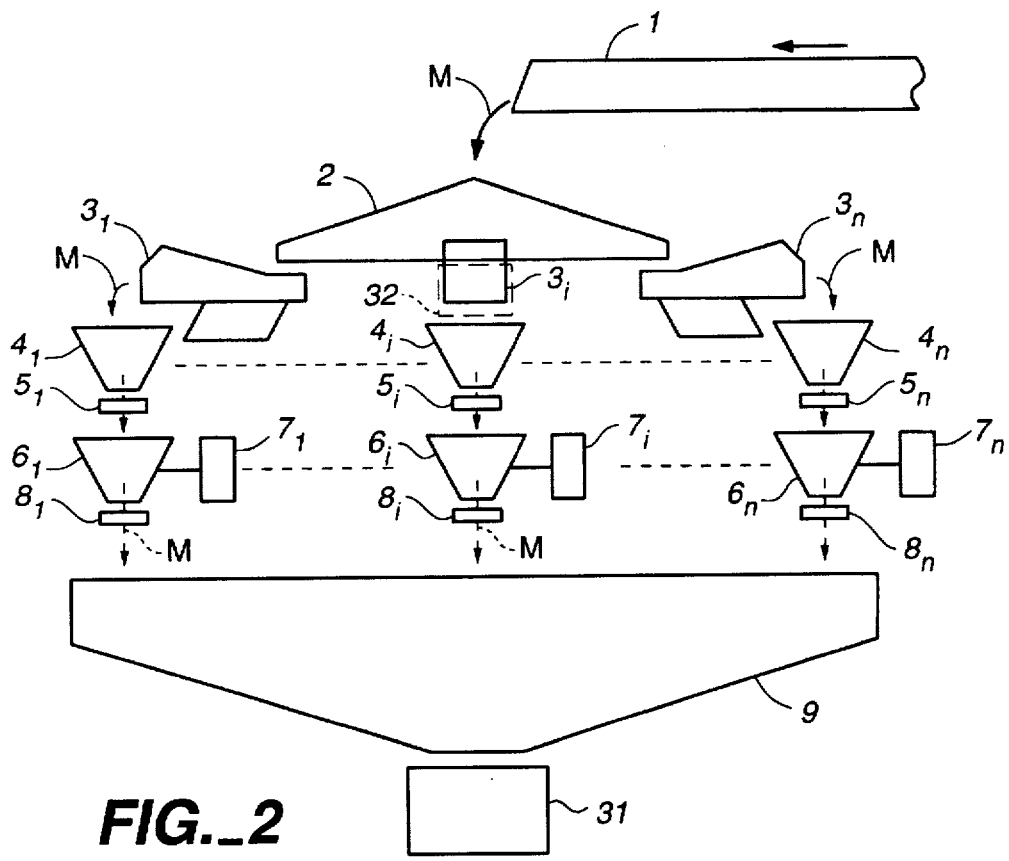
FIG._2
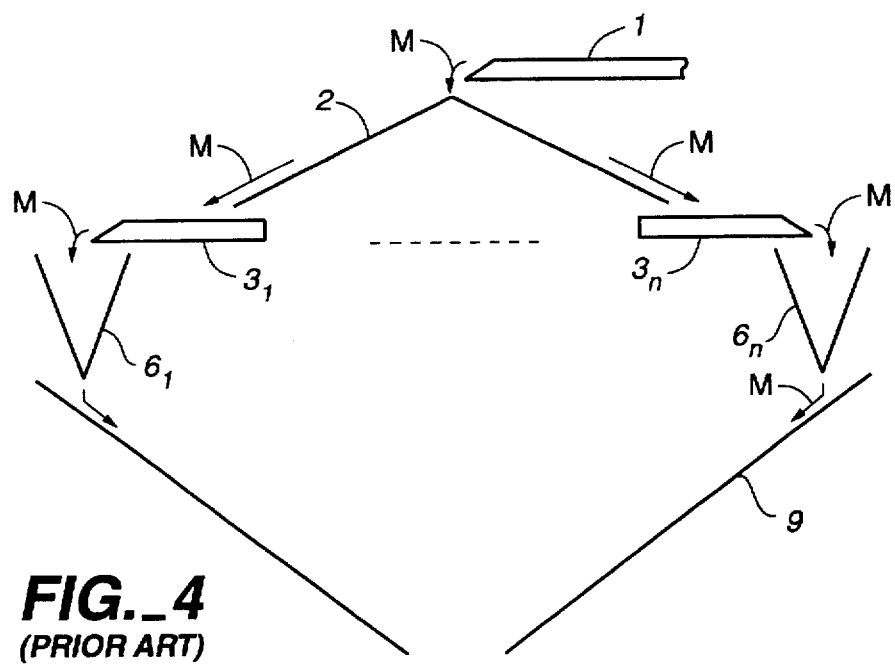
FIG._4
(PRIOR ART)

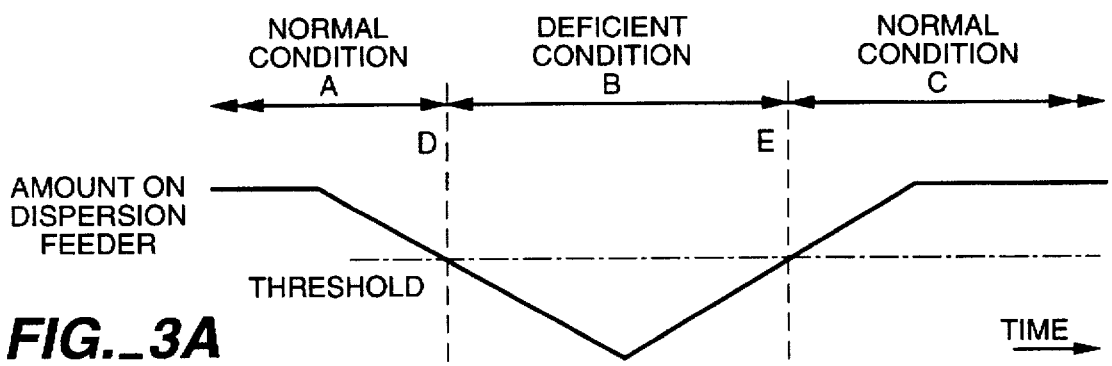
FIG._3A
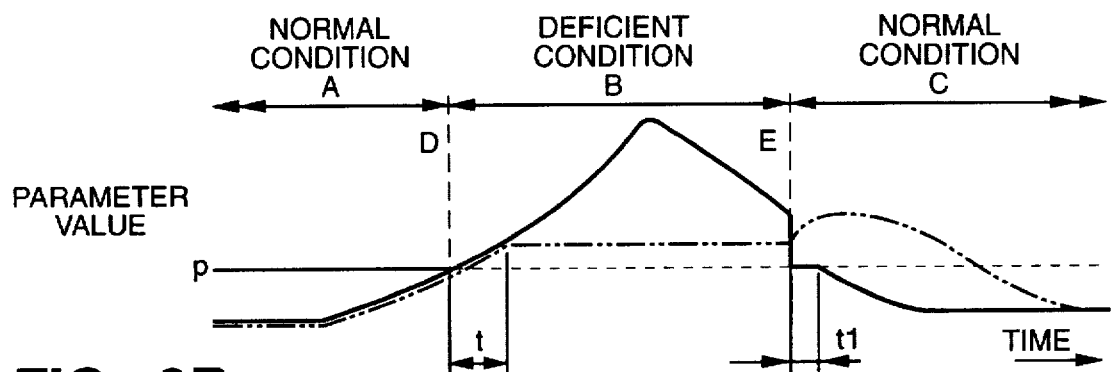
FIG._3B
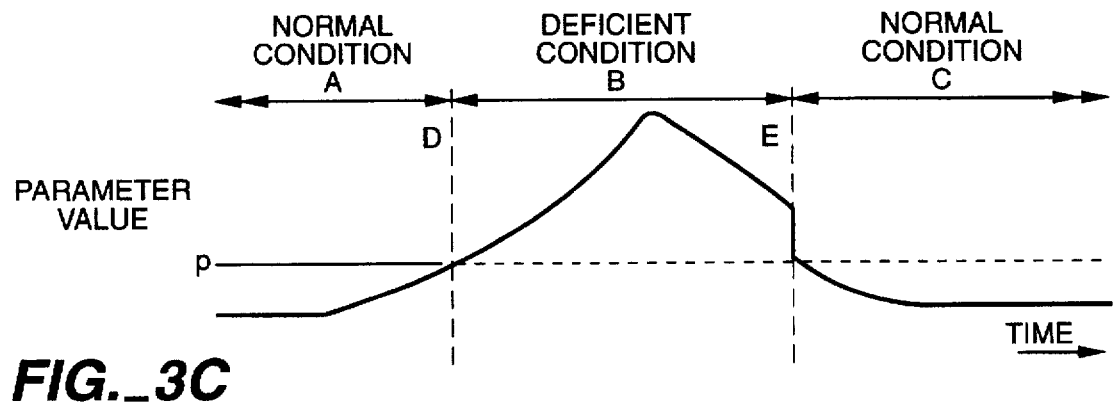
FIG._3C
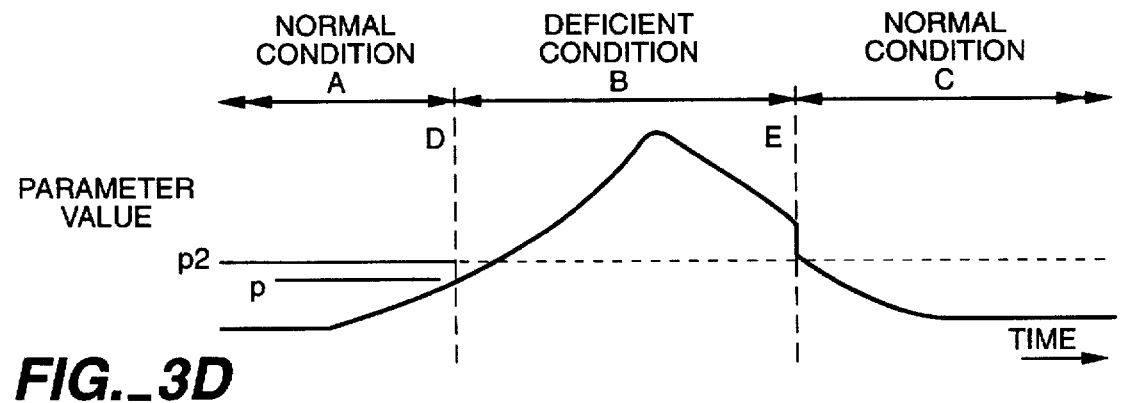
FIG._3D

COMBINATIONAL WEIGHING MACHINE

This is a continuation of application Ser. No. 08/083,738 filed Jun. 25, 1993, now abandoned.

BACKGROUND OF THE INVENTION

This invention relates to a combinational weighing machine for using many units of weighing apparatus to weigh articles such as candies, fruits and vegetables and to select a combination of weighed articles by using their measured weight values such that their total weight will satisfy a certain preset condition.

As disclosed, for example, in Japanese Patent Publication Tokkai 63-30725, combinational weighing machines are used for providing a target weight of articles such as candies, fruits and vegetables having individually different weights. As shown in FIG. 4, which illustrates such a combinational weighing machine, articles M to be weighed (hereinafter referred to simply as the articles) are transported by a conveyer 1 and supplied by way of a dispersion feeder 2 to a plural n-number of independently driven article-conducting feeders $3_1$–$3_n$ which can be vibrated individually and at different intensities and from these independently driven feeders $3_1$–$3_n$ to weigh hoppers $6_1$–$6_n$ which individually correspond thereto. There is a combination control means (not shown) for combining the measured weight values from these n weigh hoppers $6_1$–$6_n$ and thereby selecting a combination of the weigh hoppers (or articles therein) satisfying a certain preset condition. The condition may require that the total weight of the selected combination be either the closest to or equal to a target weight value. The condition may further require that the total weight be greater than the target value. The articles M thus selected are collectively discharged through a discharge chute 9.

In order to carry out such a combination-selection process accurately and efficiently, it is important to keep delivering the articles M at a steady and even rate such that the amounts delivered to the weigh hoppers $6_1$–$6_n$ are always very close to a specified value (that is, the quotient obtained by dividing the target weight value by the number of hoppers which are intended to be combined and selected). In order to accomplish this, values of parameters which characterize the mode of vibratory motion of these feeders $3_1$–$3_n$ (such as the amplitude and time duration of the vibrations) are controlled. In what follows, the values of these parameters for their individual vibratory motions will be referred to simply as the parameter values.

There is provided, for each of these independently driven article-conducting feeders $3_1$–$3_n$, a parameter setting means for setting new parameter values on the basis of the parameter values previously set (hereinafter referred to as the previous parameter values) and the amount of the articles which were actually supplied to it when these previous parameter values were controlling its vibratory motion. The feeders $3_1$–$3_n$ are operated according to the newly set parameter values such that amounts of the articles M nearly equal to the specified value would be delivered to the weigh hoppers $6_1$–$6_n$.

Amounts of articles that are supplied from the feeders $3_1$–$3_n$ vary significantly, however, depending not only upon the parameter values but also upon the quantity of the articles M (or their layer thickness) on the dispersion feeder 2. The articles M may be supplied to the dispersion feeder 2 by means of a cross feeder or a conveyer, but their rate of supply is not always stable or uniform. In other words, there may be situations, due to fluctuations in the supply rate of the articles M from the cross feeder or the conveyer, where not enough articles M are present on the dispersion feeder 2. If such a deficiency condition continues to exist, the amounts of the articles M supplied to the individual weigh hoppers $6_1$–$6_n$ become smaller than the aforementioned specified value, and since the parameter values are calculated on the basis of the amounts of the articles which are actually supplied, this means that the parameter values which are newly calculated will gradually grow larger. Eventually, the parameter values may become abnormally large such that, even after the amount of the articles M on the dispersion feeder 2 returns to a normal level, abnormally large amounts of the articles M continue to be supplied for more than a few cycles from article-conducting feeders $3_1$–$3_n$ to the weigh hoppers $6_1$–$6_n$ because of the abnormally large parameter values. As a result, some of the weigh hoppers $6_1$–$6_n$ may become too heavily loaded to effectively participate in the selection of a combination. It goes without saying that such a situation adversely affects the efficiency of combinational weighing operation.

In view of the problems of this nature, aforementioned Japanese Patent Publication Tokkai 63-30725 disclosed a method whereby the calculation of new parameter values is stopped if the deficiency condition (in which the amount of the articles M on the dispersion feeder 2 is less than a certain threshold level) has lasted for a specified length of time t. The calculation of new parameter values is resumed only after the condition returns from deficiency to normal. If the control is thus effected, the parameter value change will become as shown schematically by the broken line in FIG. 3(b) corresponding to the change in the amount of the articles M on the dispersion feeder 2 as shown in FIG. 3(a). The solid line in FIG. 3(b) shows how a parameter value may become abnormally large in a situation of supply deficiency if no such control is effected.

According to this prior art technology, however, the supply of the articles M to the weigh hoppers $6_1$–$6_n$ may become extremely small if the deficient condition of the articles M on the dispersion feeder 2 becomes more severe than anticipated. This is because the control of the parameter values is totally abandoned and hence the parameter values remain constant after the specified length of time t has elapsed in the aforementioned condition of supply deficiency. Desirable combinations of weight values cannot be obtained under such a circumstance.

The present invention has been accomplished in view of the problematical situation described above. In other words, an object of the present invention is to prevent oversupply and undersupply of articles to the weigh hoppers of a combinational weighing machine to thereby prevent the occurrence of weigh hoppers which are not selected for many cycles of combinational calculations.

SUMMARY OF THE INVENTION

A combinational weighing machine according to the present invention, with which the above and other objects can be accomplished, may be characterized as comprising a memory means for storing the parameter values as of a time of transition when the amount of the articles on the dispersion feeder changes from a normal level to a deficient level and a transfer means for outputting, when the amount of the articles on the dispersion feeder changes back from a deficient level to a normal level, parameter values dependent upon the stored parameter values in the memory means and transferring them to a parameter setting means to be used thereby as the previous parameter meters when new parameter values are calculated.

According to the present invention, the parameter values when the amount of the articles on the dispersion feeder changes from a normal level to a deficient level are stored and a feedback control is carried out when the amount of the articles changes from a deficient level to a normal level on the basis of the aforementioned parameter values which have been stored. Accordingly, supplies to the weigh hoppers do not become excessively large even if the amount of the articles on the dispersion feeder returns to a normal level suddenly. Since a feedback control is effected also when the amount of the articles on the dispersion feeder is deficient, furthermore, undersupplies to the weigh hoppers are also prevented.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic structural diagram of the control unit of a combinational weighing machine embodying the present invention;

FIG. 2 is a schematic structural diagram of a combinational weighing machine which may incorporate the present invention;

FIG. 3($a$) is a diagram of changes in the amount of articles on the dispersion feeder and FIGS. 3($b$)–3($d$) are characteristic curves showing the changes in a parameter value; and FIG. 4 is a conceptual diagram of the basic structure of a prior art combinational weighing machine.

DETAILED DESCRIPTION OF THE INVENTION

A combinational weighing machine embodying the present invention will be described next with reference to the figures.

With reference first to FIG. 2 in which like components described above with reference to FIG. 4 are indicated by the same numerals, articles M to be weighed are dropped from a conveyer 1 to the center of a flat, conical dispersion feeder 2. Around the circular periphery of the dispersion feeder 2, there are disposed a plural n-number of so-called radial feeders $3_1$–$3_n$ which are radially extending independently driven article-conducting means each adapted to vibrate according to parameter values which have been set, that is, with a specified amplitude for a specified length of time, thereby feeding the articles M on the dispersion feeder 2 into n pool hoppers $4_1$–$4_n$ each provided with a gate $5_i$. Below the pool hoppers $4_1$–$4_n$ are correspondingly disposed as many weigh hoppers $6_1$–$6_n$, each provided with a weighing device $7_i$ and a gate $8_i$. A large discharge chute 9 is provided below the gates $8_1$–$8_n$.

With reference next to FIG. 1, each of the aforementioned weighing devices $7_1$–$7_n$ may comprise, for example, a load cell adapted to measure the weight of the articles M inside the associated weigh hopper $6_i$ and to output a weight signal $w_i$ indicative of the weight value obtained thereby to a combination control means 10 and parameter setting means $20_i$. Throughout herein, subscript i is to be interpreted as a dummy parameter, indicating that there are a plurality of elements or signals represented by the symbol to which it is appended.

The combination control means 10 is for making combinations of the measured values from the weighing devices $7_1$–$7_n$, that is, the weight values of the articles M in the weigh hoppers $6_1$–$6_n$, to thereby select a combination of the weigh hoppers $6_i$ (or a combination of the articles M therein) which satisfies a preset condition. Examples of such preset conditions have been given above. The combination control means 10 includes a combination calculating means 11, a target weight setting means 12, a combination judging means 13 and a hopper control means 14. The combination calculating means 11 is adapted to calculate all combinations of m ($\leq$n) of the measured weight values from the weighing devices $7_1$–$7_n$ and to output to the combination judging means 13 combination weight signals $w_M$ representing all of the combined weight values thus calculated. The combination judging means 13 is adapted to compare the combination weight signals $w_M$ with a target weight value received from the target weight setting means 12 and to thereby select a desired combination satisfying a preset condition, outputting a selection signal a indicative of the selected combination to the hopper control means 14 and feeder control means $30_1$–$30_n$, corresponding to the n radial feeders $3_1$–$3_n$.

The hopper control means 14 serves to open the gates $8_i$ of the m weigh hoppers $6_i$ which have been selected. The articles M in these selected weigh hoppers $6_i$ are thereby discharged therefrom and collected together by the discharge chute 9 to be supplied to a packaging machine 31. The hopper control means 14 is further adapted to open the gates $5_i$ of the pool hoppers $4_i$ corresponding to the weigh hoppers $6_i$ which have become empty, thereby supplying the articles M from these pool hoppers $4_i$ to the corresponding weigh hoppers $6_i$. The feeder control means $30_i$ are adapted to activate those of the radial feeders $3_i$ corresponding to the emptied ones of the pool hoppers $4_i$ according to parameter values which have been set therefor, thereby delivering the articles M to these emptied pool hoppers $4_i$.

Each of the parameter setting means $20_i$ includes a parameter calculating means $21_i$ and a (first) memory device $22_i$, and is adapted to set new parameter values for the corresponding radial feeder $3_i$. Each of these new parameter values is set, dependent on the value previously set and the weight value outputted from the corresponding weighing device $7_i$. The memory device $22_i$ is adapted to store the parameter values previously calculated by the parameter calculating means $21_i$ and received therefrom through a switch means $33_i$ by parameter value signals $pl_i$.

Regarding the control of the feeder control means $30_i$ by the combination judging means 13 and the parameter calculating means $21_i$, the reader is referred to published documents such as U.S. Pat. No. 4,534,428 issued Aug. 13, 1985 to Mosher et al. and Japanese Patent Publications Tokkai 59-622 and 62-113027, all of which are herein incorporated by reference.

On the basis of the weight signal $w_i$ from the weighing device $7_i$, the parameter calculating means $21_i$ determines whether the amount supplied to the corresponding weigh hopper $6_i$ is greater than or smaller than a specified value. If the amount supplied to the weigh hopper $6_i$ is found to be within a specified range including the specified value, the previous parameter values from the memory device $22_i$ are directly outputted as parameter value signals $pl_i$. If it is found to be over this range, the previous parameter values retrieved from the memory device $22_i$ are reduced by one unit and the reduced parameter values thus obtained are outputted as parameter value signals $pl_i$. If the amount supplied to the weigh hopper $6_i$ is determined to be below this range, on the other hand, the parameter calculating means $21_i$ increases the previous parameter values from the memory device $22_i$ by one unit, outputting the increased parameter values thus obtained as parameter value signals $pl_i$. Although not shown in the figures, both the parameter calculating means $21_i$ and the memory device $22_i$ contain a part related to the amplitude of vibrations and another part related to the time duration of the vibrations.

The dispersion feeder 2 is provided with a detector 32 comprising, for example, a load cell. This detector 32 is adapted to detect the weight of the dispersion feeder 2 and the articles M thereon and to output to a judging means 34 a total weight signal $w_a$ indicative of the total weight value measured thereby.

The judging means 34 includes a map and is adapted to determine whether or not the weight of the articles M on the dispersion feeder 2 is greater than a specified threshold level, that is, whether or not this weight is within a normal range or deficient. The judging means 34 is also adapted to determine whether or not the weight of the articles M on the dispersion feeder 2 has changed from the normal range to the deficient range and, if such a change is detected, to output a pulse signal c to a switching circuit $35_i$ to thereby close the switching circuit $35_i$ for a short period of time. The judging means 34 is further adapted to determine whether or not the weight of the articles M on the dispersion feeder 2 has returned from a deficient level back to a normal level and, if such a return is detected, to output a switch signal d to a hold means 36 for holding this switch signal d for a fixed length of time $t_1$ and to then continue to output it to the switch means $33_i$, causing the switch means $33_i$ to change its connection from terminal f to terminal g.

After the switching circuit $35_i$ is closed, the parameter values calculated by the parameter calculating means $21_i$ are transferred as parameter value signals $pl_i$ by a (first) transfer means $37_i$ to be stored in another (second) memory device $38_i$. In other words, the second memory device $38_i$, is for storing the parameter values as of the time when the amount of the articles M on the dispersion feeder 2 changes from a normal level to a deficient level. The value of the amount of the articles M on the dispersion feeder 2 at the boundary between the normal level and the deficient level will be hereinafter referred to as the normal-to-deficient threshold level. When the switch means $33_i$ is switched so as to make the connection to the terminal g, the parameter values stored in the second memory device $38_i$ are transferred by another (second) transfer means $39_i$ and come to be stored in the first memory device $22_i$. In other words, the second transfer means $39_i$ serves, when the amount of the articles M on the dispersion feeder 2 returns from a deficient level back into a normal level, to output as previous parameter values the parameter values then stored in the second memory device $38_i$ into the first memory device $22_i$ of the parameter setting means $20_i$. The value of the amount of the articles M on the dispersion feeder 2 at the boundary between the deficient level and the normal level, as it changes from the former to the latter, will be hereinafter referred to as the deficient-to-normal threshold level. As will be explained below, the normal-to-deficient threshold level and the deficient-to-normal threshold level need not be the same. In other words, the boundary between what may be called a normal level and what may be called a deficient level is not definitely definable. The user is allowed to empirically determine and set these threshold levels.

Next, the operation of the combinational weighing machine as a whole will be explained. Let us first consider a normal situation where the amount of the articles M on the dispersion feeder 2 is within a normal range. The articles M are delivered onto the dispersion feeder 2 from the conveyer 1, passed through the radial feeders $3_i$, the pool hoppers $4_i$, the weigh hoppers $6_i$ and the discharge chute 9, and packaged together by the packaging machine 31. During this process, the combination control means 10 selects a combination of m weigh hoppers $6_i$ satisfying a preset condition. In the next cycle of the operation, the combination control means 10 selects another combination from the remaining weigh hoppers $6_i$ and carries out a combinational discharge similarly. In the meantime, the hopper control means 14 opens the gates $5_i$ of the pool hoppers $4_i$ corresponding to the already discharged weigh hoppers $_6i$ to thereby cause the articles M to be delivered from these pool hoppers $4_i$ to the empty weight hoppers $6_i$. The radial feeders $3_i$ corresponding to the discharged pool hoppers $4_i$ are activated such that the articles M are supplied into those emptied pool hoppers $4_i$.

The parameter values at this moment are calculated by the parameter calculating means $21_i$ on the basis of previously used parameter values now stored in the first memory device $22_i$ and the measured weight value from the weighing device $7_i$. The calculated parameter values are outputted not only as new parameter values to the feeder control means $30_i$ but also to the first memory device $22_i$. These operations, inclusive of the calculation of parameter values, are continued not only under a normal condition but also under a deficient condition, respectively indicated by A and B in FIG. 3(a). As the amount of the articles M on the dispersion feeder 2 decreases and increases as shown in FIG. 3(a), a corresponding parameter value will change as shown by the solid line in FIG. 3(b). For simplicity of illustration, the normal-to-deficient and deficient-to-normal threshold levels are set equal in FIG. 3.

When the amount of the articles M on the dispersion feeder 2 changes from a normal level to a deficient level (that is, when it crosses the normal-to-deficient threshold level from above at Point D in FIG. 3), this change is detected by the judging means 34, the switching circuits $35_i$ are closed, and the second transfer means $39_i$ transfers the current parameter values P to the second memory device $38_i$ to be stored therein.

If the deficient condition B of FIG. 3(a) ceases to exist and the system returns to another normal condition C (that is, when the deficient-to-normal threshold level is crossed from below at Point E), this transition is detected by the judging means 34, and a switch signal d is outputted to the switch means $33_i$ through the hold means 36 for a fixed length of time $t_i$, causing the switch means $33_i$ to connect to terminal g. As a result, the aforementioned parameter values P stored in the second memory device $38_i$ are transferred by the second transfer means $39_i$ to the first memory $22_i$ to be stored therein. Thereafter, the parameter calculating means $21_i$ calculates new parameter values $P+\Delta P$ on the basis of the (previous) parameter values P and the weight signal $w_i$ from the weighing device $7_i$. These newly calculated parameter values $P+\Delta P$ are not transferred to the first memory device $22_i$ because the switch means $33_i$ is then connected to terminal g. Thus, the constant parameter values P are outputted from the first memory device $22_i$ as shown in FIG. 3(b), and the constant new parameter values $P+\Delta P$ are outputted to the feeder control means $30_i$.

After this fixed length of time $t_i$ has elapsed, the switch means $33_i$ switches its connection to terminal f, and the control returns to the normal mode as described above. The parameter values are thereby reduced as shown in FIG. 3(b) as the amount of the articles M on the dispersion feeder 2 increases, as shown in FIG. 3(a).

With combinational weighing machines thus structured, the parameter values are controlled as shown in FIG. 3(b)

even under a deficient condition B. Thus, the rates of supply to the weigh hoppers $6_i$ are prevented from becoming excessively small even under a deficient condition. In other words, situations of undersupply with respect to the target weight value can be prevented from occurring.

Since the articles M on the dispersion feeder 2 are transported to the weigh hoppers $6_i$ sequentially through the radial feeders $3_i$ and the pool hoppers $4_i$, changes in the parameter values are somewhat delayed from those in the amount of the articles M on the dispersion feeder 2. Thus, although the amount of the articles M on the dispersion feeder 2 can be increased rapidly through the conveyer 1 to overcome a deficient condition, the parameter values may not respond quickly thereto or necessarily become smaller correspondingly. Thus, if the system is controlled according to the prior art technology and in the same way as in Conditions A and B even after Point E of FIG. 3(a) is passed, the amounts of the articles M supplied to the weigh hoppers $6_i$ may become abnormally large. According to the present invention, by contrast, the parameter values P at the moment of transition from normal to deficient conditions are used as the new parameter values when the system returns to a normal condition from a deficient condition. Thus, the rates of supply to the weigh hoppers $6_i$ are prevented from becoming excessively large.

If the system returns to a normal control immediately after it returns to a normal condition from a deficient condition, the parameter values may increase as shown by the broken line in FIG. 3(b), bringing about a similarly undesirable result. According to the embodiment of the present invention described above, the parameter values are maintained unchanged (at P in the memory devices and P+ΔP at the feeder control means) for a fixed length of time $t_i$, after the system returns to a normal condition, and hence the supply to the weigh hoppers $6_i$ does not become abnormally large.

The invention has been described above by way of a single embodiment, but this example is intended to be illustrative and not to limit the scope of the invention. Many modifications and variations are possible within the scope of this invention. For example, although the parameter values are maintained unchanged at P (or at P+ΔP) for a fixed length of time $t_i$ immediately after the system returns to a normal condition according to the embodiment of the invention described above, the invention does not require the parameter values to necessarily remain unchanged. The system may be returned to a normal feedback control immediately after it returns to the normal condition C on the basis of the parameter values P as shown in FIG. 3(c). Although the parameter values are held constant according to the embodiment of the invention described above by using the hold means 36 to prevent the newly calculated parameter values from becoming transferred to and stored in the first memory device $22_i$, the parameter values may be held constant while allowing the parameter values P in the second memory device $38_i$ to be continuously sent to the feeder control means $30_i$ for the fixed length of time $t_i$. Moreover, although a single hold means 36 was provided according to the embodiment described above and illustrated in FIG. 1, n hold means may be provided individually to the n radial feeders $3_i$ and weighing devices $7_i$. If each weighing device $7_i$ is provided with a separate hold means (not illustrated), the holding time $t_1$ can be individually controlled. For example, the hold condition may be maintained only for those weighing devices $7_i$ measuring small weight values and released for those measuring normal or large weight values. In other words, the holding time $t_1$ is preset if there is only one hold means 36 as shown in FIG. 1, but it will be variable if a plurality of hold means are used as explained above, depending on measured weight values.

Although the parameter values P at the transition point D of FIG. 3(b) are used as the "previous parameter values" P according to the embodiment of the invention described above when the system returns to the normal condition C at Point E, neither is this intended to limit the scope of the invention. Depending on the type of combinational weighing machine or the factory where it is installed, different parameter values $P_2$ which may be larger or smaller than the parameter values P at the transition point D may be used as the "previous parameter values" when the system returns from a deficient condition B to a normal condition C, as illustrated in FIG. 3(d).

Although only one threshold level was used in FIG. 3 for the amount of the articles M on the dispersion feeder 2, somewhat different normal-to-deficient and deficient-to-normal threshold values may be used for defining transition points D and E respectively, as explained above.

Although the invention was described above with reference to a combinational weighing machine with pool hoppers $4_i$, these pool hoppers $4_i$ are not necessary for the application of the present invention. It also goes without saying that conveyers and other kinds of transporting means can be used in place of the radial feeders $3_i$. In fact, the present invention is equally applicable to the type of combinational weighing machines with trough-like, elongated, independently driven feeders disposed not radially but parallel to each other, although the radial feeders $3_i$ of FIG. 2 are circularly disposed and radially oriented with the dispersion feeder 2 at the center.

According to the present invention, as described above, the parameter values as of the time of a transition when the amount of the articles to be weighed on the dispersion feeder changes from a normal level to a deficient condition is stored and thereafter outputted as the previous parameter values when the amount of the articles on the dispersion feeder returns from a deficient condition to a normal condition, thereby carrying out a feedback control on the basis of the stored parameter values. As a result, the articles are prevented from being supplied to the dispersion feeder at an excessively large rate when the their amount on the dispersion feeder returns to a normal level from being deficient. Since the parameter setting means of the present invention carries out a feedback control also when the amount of the articles on the dispersion feeder is in a deficient condition, the rate of supply of the articles to the weigh hoppers is prevented from becoming excessively small. In summary, since oversupply and undersupply to the weigh hoppers can be prevented according to the present invention, occurrence of weigh hoppers which cannot effectively participate in the selection of a combination can be prevented. In other words, the present invention serves to improve the efficiency of a combinational weighing machine.

What is claimed is:

1. In a combinational weighing machine comprising:
   a plural n-number of feeders for supplying articles to be weighed from an upstream position to n-number of weigh hoppers individually associated with said feeders; and feeder control means for activating said feeders according to weight values measured by weighing devices individually associated with said weigh hoppers;

said combinational weighing machine selecting a combination of said articles by combining said weight values obtained by said weighing devices;

the improvement wherein said combinational weighing machine further comprises:

detecting means for detecting the amount of said articles at said upstream position; and control means for continuously controlling the vibrations of said feeders according to said weight values measured by said weighing devices independently of the amounts detected by said detecting means, and, when the amount detected by said detecting means changes from above to below a first predefined threshold value at an earlier time and subsequently changes from below to above a second predefined threshold value, adjusting vibrations of said feeders according to the modes of vibrations of said feeders at said earlier time.

2. The combinational weighing machine of claim 1 wherein said preset modes depend on the modes of vibrations of said feeders when the amount detected by said detecting means most recently decreased from above to below said first threshold value.

3. The combinational weighing machine of claim 2 wherein said preset modes are equal to the modes of vibrations of said feeders when the amount detected by said detecting means most recently decreased from above to below said first threshold value.

4. A combinational weighing machine comprising:

a plural n-number of feeders each adapted to be activated according to parameter values which have been set therefor and to thereby transport articles to be weighed on a dispersion feeder to n-number of weigh hoppers individually associated with said feeders;

parameter value setting means for calculating new parameter values for feeders according to previous parameter values which were previously set by said parameter value setting means and weight values measured by weighing devices individually associated with said weigh hoppers;

feeder control means for activating said feeders according to weight values measured by weighing devices individually associated with said weigh hoppers, said combinational weighing machine selecting a combination of said articles by combining said weight values obtained by said weighing devices;

detecting means for detecting the amount of said articles on said dispersion feeder;

control means for continuously controlling the vibrations of said feeders according to said weight values measured by said weighing devices independently of the amount detected by said detecting means, and, when the amount detected by said detecting mean, changes from above to below a first predefined threshold value at an earlier time and subsequently changes from below to above a second predefined threshold value, adjusting vibrations of said feeders according to the modes of vibrations of said feeders at said earlier time;

memory means for storing first parameter values calculated by said parameter value setting means as of a time when the amount of said articles on said dispersion feeder decreases and changes from above to below said first threshold value; and transfer means for sending second parameter values dependent upon said first parameter values stored by said memory means to said parameter value setting means so as to serve as said previous parameter values when the amount of said articles on said dispersion feeder increases and changes from below to above said second threshold value.

5. The combinational weighing machine of claim 4 wherein said preset modes depend on the modes of vibrations of said feeders when the amount detected by said detecting means most recently decreased from above to below said first threshold value.

6. The combinational weighing machine of claim 5 wherein said preset modes are equal to the modes of vibrations of said feeders when the amount detected by said detecting means most recently decreased from above to below said first threshold value.

7. The combinational weighing machine of claim 4 wherein said parameter value setting means is adapted to continue calculating new parameter values and to thereby indefinitely continue controlling supply rates of said articles by said independently driven feeders independent of the amount of said articles on said dispersion feeder with respect to said threshold values.

8. The combinational weighing machine of claim 4 wherein said second parameter values are equal to said first parameter values previously stored by said memory means.

9. The combinational weighing machine of claim 4 wherein said parameter values determine vibration amplitudes and durations of vibrations of said feeders.

10. The combinational weighing machine of claim 4 further comprising:

a detector for outputting a total weight signal indicative of the weight of said articles on said dispersion feeder; judging means for receiving said total weight signal and determining whether said dispersion feeder has thereon a normal amount or a deficient amount of said articles relative too said first threshold value; and switch means controlled by said judging means for allowing said second parameter values to be transferred to said parameter value setting means for no more than a specified length of time immediately after said judging means determines that the amount of said articles on said dispersion feeder changes from a deficient level to a normal level relative to said second threshold value.

11. A combinational weighing machine, comprising:

a plurality of weighing units each including a weighing device for weighing articles and outputting a weight value measured thereby, a feeder for transporting articles from an upstream position to said weighing device, and feeder control means for operating said feeder according to values of parameters set for said feeder; and a combination calculating means for selecting a combination of said weighing devices according to said weight values outputted from said weighing devices;

each of said weighing units further including:

parameter-setting means for setting new values of said parameters for said feeder according to the current values of said parameters for said feeder and a measured weight of said articles at said upstream position, said new values continuing to be set even when said measured weight value of said articles at said upstream position changes from a normal range above a predetermined threshold level to a deficient range below said threshold level;

a memory device for storing the values of said parameters as of a time when said measured weight of said articles at said upstream position changes from said normal range into said deficient range; and transfer means for transferring values of said parameters stored in said memory device to said parameter-setting means when said measured weight of said articles at said upstream position changes from said deficient range into said normal range and thereby causing said transferred values, rather than said current values of said parameters, to be used by said parameter-setting means in setting said new values of said parameters.

* * * * *